UNITED STATES PATENT OFFICE.

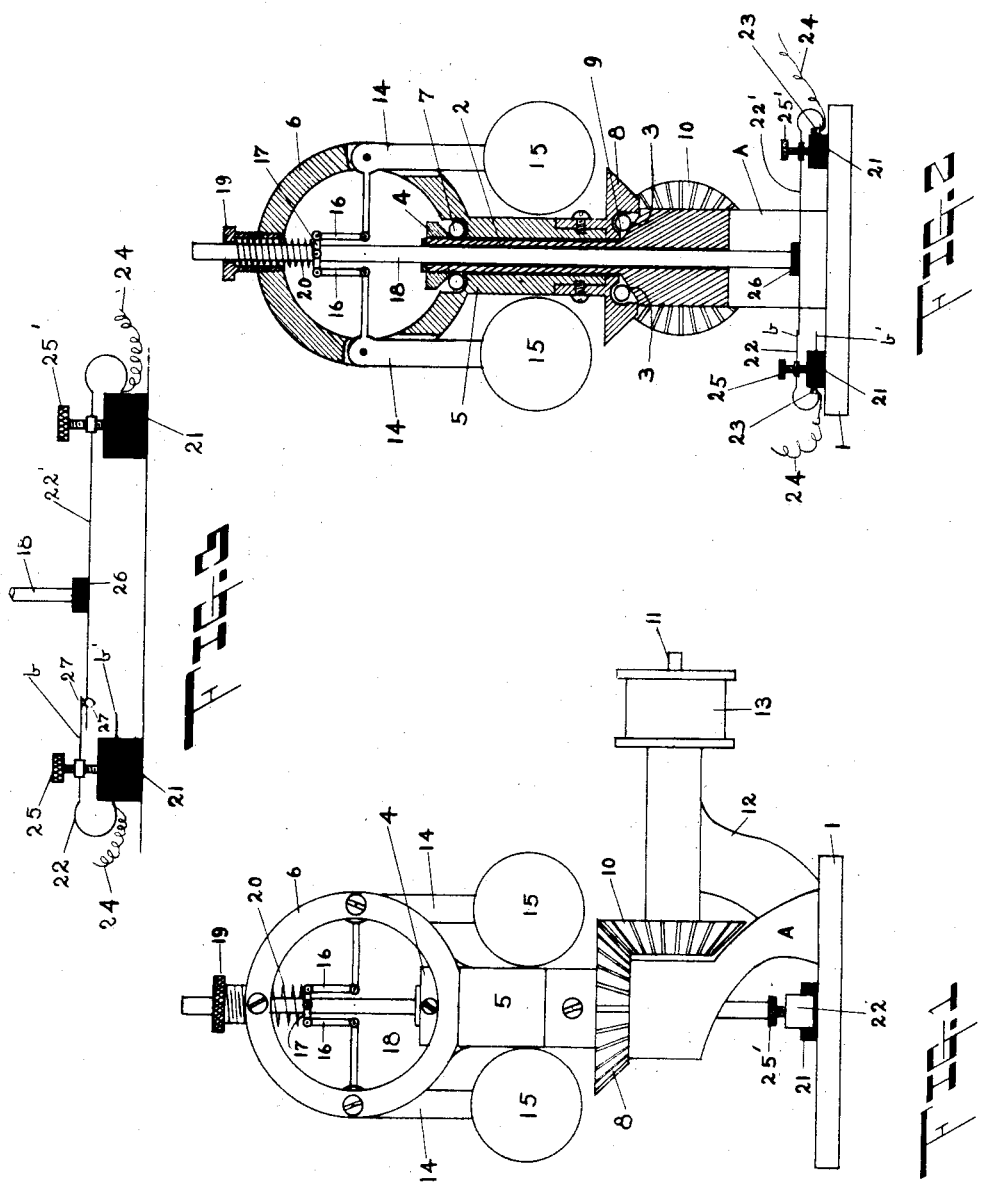

CLINTON R. LANPHEAR, OF MIDLAND, MICHIGAN.

GOVERNOR.

No. 867,664.  Specification of Letters Patent.  Patented Oct. 8, 1907.

Application filed December 6, 1906. Serial No. 346,629.

*To all whom it may concern:*

Be it known that I, CLINTON R. LANPHEAR, a citizen of the United States, residing at Midland, in the county of Midland and State of Michigan, have invented certain new and useful Improvements in Electromechanical Governors, and do hereby declare the following to be a full, clear, and exact description of the invention, such as will enable others skilled in the art to which it appertains to make and use the same.

My invention relates to electro-mechanical governors.

One object of my invention is to provide a simple yet absolutely reliable means for automatically closing a circuit to cut off the power or give an alarm when the speed exceeds or diminishes below a predetermined rate. Such a mechanism as this is highly necessary in any power device wherein the load to be driven or the work to be done may vary, as with a light load the machinery will speed up, or with a heavy load the speed will diminish. Another cause of diminished power would be the clogging of the machinery, of which my invention would give notice or shut off the power. Its use is also of great importance wherever belting is employed, as for instance, should such belting break or slip off the pulleys, or in case the belting slipped on the pulleys, as where an obstruction clogs the machinery, it is very apt to become wedged against the side of the pulley and the friction is liable to cause a fire, either owing to the belt itself taking fire and carrying it to adjacent woodwork, or from sparks dropping into an inflammable or combustible material.

My invention is also capable of use as a "speed governor" to control or regulate the speed of the moving parts, it being obvious that the governor might be employed in connection with electrically operated stop valves.

To these and other ends, therefore, my invention consists in the combination of a centrifugal governor with a make-and-break contact, the novelty residing in the novel features and combinations, more fully described hereinafter and particularly pointed out in the claims.

Another object is to provide a means for offsetting the tension of the spring contacts used in the make and break.

In the accompanying drawings illustrating one embodiment of my invention, Figure 1 is a view in side elevation of an electro-mechanical governor constructed in accordance with my invention, Fig. 2 is a partial vertical section through the device, and Fig. 3 is a detail view of the contacts.

(A) indicates a suitable standard on a base (1), the upper part of the standard being reduced in circumference and bored out, as shown at (2) to form a spindle having a cone bearing or shoulder (3) at its point of connection with the body portion of the standard, the upper end of the hollow spindle designed to receive a second cone bearing (4).

The spindle is encircled by a sleeve (5) which sleeve at its upper end is provided with a circular frame (6). A ball bearing (7) is located on the sleeve and in engagement with the cone (4), the lower end of the sleeve being equipped with a gear (8) and ball bearing (9), the latter engaging the cone shoulder (3), and constituting together with the ball bearing (7), an antifriction support for the frame. A second gear (10) carried on the shaft (11), supported, it may be, in a bracket (12) meshes with the gear (8), the counter shaft (11) also conveniently having a pulley (13) connected with a moving part of the machine to be controlled by means of a belt, not shown. Of course, gearing might be substituted in place of the pulley and belt without deviating from the spirit and scope of my invention.

Pivotally secured at diametrically opposite points on the annular rotatable frame (6) are the rigid bell cranks (14) (14), the outer ends of each of which are provided with the governor balls (15), the inner ends of the arms having the links (16) (16) secured thereto, the opposite ends of the links being pivotally secured to a collar (17) adjustably mounted on a vertically extending rod (18) slidingly received in the hollow spindle (2) and protruding therebeneath, as shown. The upper end of the sliding rod passes through the periphery of the annular frame, by which the rod is guided in its reciprocation.

By connecting the rod (18) to the governor balls in the manner shown a greater range of movement is given the rod (18).

An adjusting cap (19) is adjustably secured to the frame (6), the rod passing loosely through the cap, which cap is recessed to serve as a seat for one end of a compression spring (20), the opposite end of which spring engages and bears against the collar (17) on the sliding rod (18).

Conveniently mounted on the base (A) are a pair of fiber or other suitable non-conducting blocks (21) (21) designed to support the separable make-and-break contacts (22) (22') preferably of the flat spring bow shape shown, the contacts each being suitably connected, as by means of the binding posts (23) (23), with the circuit wires (24) (24). The free arms of each spring contact project toward and overlap each other, whereby to complete the circuit, each free arm carrying a set screw (25) (25'), the ends of which engage the respective fiber blocks for adjusting the free arms of the make-and-break contact relative to each other. The free arms, at their points of contact, may be provided with platinum studs (27).

The underlapping free spring arm carries a fiber or other insulating block (26) having a step bearing formed therein to receive the lower end of the sliding rod (18). The non-conducting blocks absolutely prevent short circuiting to any part of the device. The circuit wires (24) (24) lead to any suitable electro-responsive mechanism for actuating a switch, a valve, alarm or whatnot. The set screw (25′) is designed to adjust the tension of the movable spring arm (22′) relative to the sliding rod (18), the spring arm operating as a regulating spring therefor. The set screw
(25) merely adjusts the height of the overlapping spring arm (22).

The coil spring (20) is adapted to counteract the effect of the spring contact arm (22′) and also to a certain extent, the effect of the governor balls on the rod (18) when such balls are in the lowered position shown. Thus the spring (20) balances the rod (18) to render the latter more sensitive to any change in the position of the governor balls when thrown outward, such outward movement of the balls causing the rod to break the contact when the governor is rotating at a comparatively low speed.

The spring contact piece (22) is U-shaped, the free end of the arm (22′) being received and movable between the ends (b) (b′) of the U-shaped piece. Normally, the governor will retain the free end of arm (22′) at some point intermediate the ends (b) (b′) of the double contact (22) and out of engagement therewith when the device is in operation. In case the speed increases unduly, the speed of that portion of the machine to which the governor is attached will also be increased in the same ratio through the bevel gears (8) and (10), the former rotating the sleeve (5) with its annular frame (6) carrying the governor balls (15), causing the latter to move outwardly, and lowering the inner ends of the bell crank arms (14), which pull downward on the links (16) and collar (17), to depress the rod (18) against the tension of the spring contact arm (22′) until when the predetermined speed at which the governor has been set is reached, the free end (b′) of such arm is caused to engage the lower end (b′) of the U-shaped contact (22), thus closing the circuit to any electro-responsive means, with which the governor may be operatively connected, to actuate an alarm or shut down the power.
On the other hand, should the speed of the parts decrease below the normal, the weight of the governor balls will raise the rod (18) to permit the arm (22′) to move upward until it made contact with the end (b) of the U-shaped piece, thereby closing the circuit and accomplishing the aforementioned result.

It is obvious that the arm (22′) is adapted to vibrate between the ends (b) (b′) of the contact (22).

In case the governor is used to limit the speed of the machine, the device would be connected in circuit with a suitable electrically operated stop valve and any acceleration of speed above a predetermined amount would operate the governor to close the circuit through contact arm (22) and point (b′). The point (b), in this event, would serve as a safety device, so that in case the governor belt broke, for instance, a circuit would be completed through the arm (22) and point (b) to close the stop valve as before, thus absolutely preventing accident when the governor is in operative condition.

The governor is designed to operate as a safety stop for motors, it being possible to connect it in circuit with the actuating mechanism of an electrically operated circuit breaker, the governor being driven by belt or gearing from some uniformly rotating or reciprocating portion of the machinery.

It is evident that many changes might be made in the form and arrangement of the several parts described without departing from the spirit and scope of my invention, and hence, I do not wish to limit myself to the exact construction herein set forth.

Having thus fully disclosed my invention, what I claim as new is—

The combination in a governor with a base, insulating blocks on the base, of a make-and-break contact carried by the blocks, the contact comprising a bow-string and an upwardly pressing spring arm, the free end of which lies between the ends of the bow spring, a vertically movable rod, an insulating block interposed between the lower end of the rod and the spring arm, a collar fixed to the rod, an annular rotatable frame, bell cranks pivotally mounted in the opposite sides of the annular rotatable frame, and carrying governor balls, links connecting the bell cranks and collar, the annular rotatable frame provided with a downwardly extending rotatable sleeve carrying a bevel gear whereby the frame is rotated, a compression spring adapted to counteract the upward effect of the spring arm, an adjusting cap controlling the tension of the compression spring, a hollow spindle carried by the base, and ball bearings at the upper and lower ends of the rotating sleeve.

In testimony whereof, I affix my signature in presence of two witnesses.

CLINTON R. LANPHEAR.

Witnesses:
PAUL ENGROIS,
B. B. BALL.